United States Patent [19]

Ishibashi et al.

[11] 4,340,801
[45] Jul. 20, 1982

[54] CONTINUOUS HEATING APPARATUS FOR METAL CAPS

[75] Inventors: Kazuhisa Ishibashi, Yokohama; Hidehiko Omi, Hiratsuka, both of Japan

[73] Assignee: Toyo Seikan Kaisha, Ltd., Tokyo, Japan

[21] Appl. No.: 223,822

[22] Filed: Jan. 9, 1981

Related U.S. Application Data

[63] Continuation of Ser. No. 39,122, May 15, 1979, abandoned.

[30] Foreign Application Priority Data

May 26, 1978 [JP] Japan .................................. 53-62304
Jul. 19, 1978 [JP] Japan .................................. 53-87079

[51] Int. Cl.$^3$ .......................... H05B 6/10; H05B 6/40
[52] U.S. Cl. ............................. 219/10.71; 219/10.53; 219/10.67; 156/379.7
[58] Field of Search ............... 219/10.69, 10.71, 10.67, 219/10.73, 10.75, 10.79, 10.57, 10.41, 10.43, 10.49 R, 10.53; 156/380, 272, 275, 69; 198/645, 655, 688, 690, 952

[56] References Cited

U.S. PATENT DOCUMENTS

| | | | |
|---|---|---|---|
| 2,439,517 | 4/1948 | Johnson | 219/10.69 X |
| 2,818,483 | 12/1957 | Blume | 219/10.69 |
| 3,083,285 | 3/1963 | Haimbaugh et al. | 219/10.69 |
| 3,251,976 | 5/1966 | McBrien | 219/10.41 X |
| 3,694,609 | 9/1972 | Kennedy | 219/10.79 |
| 3,723,212 | 3/1973 | Casper | 219/10.53 X |
| 3,898,410 | 8/1975 | Peters, Jr. | 219/10.49 R |
| 4,199,672 | 4/1980 | Sword et al. | 219/10.79 X |
| 4,237,360 | 12/1980 | Pohlenz | 219/10.71 X |

FOREIGN PATENT DOCUMENTS

2845927  4/1979  Fed. Rep. of Germany ... 219/10.71
47-41398 10/1972  Japan ................................. 219/10.69

OTHER PUBLICATIONS

Basics of Induction Heating, vol. I, pp. I-120-I-123, by C. Tudbury, Copyright May 1960.

*Primary Examiner*—Thomas J. Kozma
*Assistant Examiner*—Philip H. Leung
*Attorney, Agent, or Firm*—Pennie & Edmonds

[57] ABSTRACT

A continuous heating apparatus for metal caps having at least one pair of high frequency electric conductors where the conductors are separated by an interval smaller than the diameter of the bottoms of the caps to be heated. A guide panel is spaced from the conductors and is adapted to engage the open end of the metal caps when the caps are moved away from the conductors towards the guide panel due to the repulsion effect occurring between the high frequency current in the conductors and current induced in the caps. A transport device moves the metal caps relative to the conductors.

5 Claims, 9 Drawing Figures

CONTINUOUS HEATING APPARATUS FOR METAL CAPS

This is a continuation of application Ser. No. 39,122, filed May 15, 1979, now abandoned.

TECHNICAL FIELD

The invention relates to a continuous heating apparatus for heating metal caps by means of a continuous high frequency heating means. The apparatus includes at least one pair of high frequency electrical conductors which face towards the bottom of the metal caps and where the conductors are spaced apart at a distance less than the diameter of the caps. A guide panel is spaced from the conductors and limits movement of the metal caps away from the conductors due to the repulsion effect occurring between the high frequency electrical current in the conductors and the current induced in the caps. The metal caps are adapted for use as closures for bottles and jars and include caps made of non-magnetic material such as aluminum.

BACKGROUND ART

Metal caps including caps or crowns made by shallow stamping or deep stamping of metal sheets and into which threading may be added if required, as in the case of pilfer-proof caps, include many different types. Some types are coated prior to heating while others are not. Some types have printing applied prior to heating while others may have adhesives painted on their lower inside surfaces prior to heating after which a thermoplastic resin lining is applied.

Among these metal caps, and particularly those caps used to seal the openings of containers such as bottles or wide neck jars, have been those having their inside lower surfaces lined with a packing material which has included cork or a thermoplastic resin sheet or lining material, including vinyl chloride, polyethylene or polypropylene. Use of polypropylene as a lining material has increased recently and in order to attach such as liner to the inside surface of a cap, it has required the inside lower surface of the cap to be painted with an adhesive primer after which the lining material is inserted onto the primer. Prior and after the insertion of the liner, the cap bottom is heated to about 100°–200° C.

A prior apparatus for the continuous heating of metal caps, and particularly crowns which have been generally made from a magnetic material such as tin plate or a tin free steel, has involved subjecting the caps to heated air. Such an apparatus is disclosed in Japanese Patent Application Publication No. 41-5588 (of 1966). In this apparatus, crowns are heated to about 160° C. while being transported by a rotatable table or turntable having concave notches on the periphery engaging the face of the crowns. Such apparatus however requires an inordinate amount of time to raise the crown to the desired temperature, or if the apparatus is to perform high speed heating, such as on the order of 1,000 pieces per minute, requires a very large heating system with the result that the apparatus cannot be made compact. Further, with this apparatus, areas of the crown not requiring heating, such as the outer wall of the shell, are heated resulting in a waste of energy.

High frequency heating apparatus has been proposed for overcoming the aforementioned deficiencies and an example of such is disclosed in Japanese Patent Application Publication No. 47-41398 (of 1972). The apparatus of that application includes hairpin high frequency coils positioned beneath a conveyor on which the crowns are transported. While this apparatus can effectively heat crowns made of a strongly magnetic material where a magnetic flux can be concentrated, the apparatus is not effective for heating caps made of a non-magnetic material such as aluminum. This is because the conveyor supporting the caps has a certain thickness which is interposed between the caps and the heating coils thus reducing the mutual induction relation between the caps and the coils to a very small amount with the result that the temperature of the cap does not rise to any extent. If the cap and heating coils of this apparatus are brought close together by making the conveyor very thin in order to raise the mutual induction relation, then the caps will jump from the surface of the conveyor and tend to float above the conveyor thus lengthening the distance between the caps and the coil to reduce the induction effect and make effective heating impossible. This floating and jumping of the caps is the result of the repulsion effect occurring between the high frequency coil magnetic field and the dielectric current induced in the aluminum cap bottoms. When strongly magnetic caps such as crowns are heated in the above-described apparatus, the cap itself becomes magnetized by a magnetic field created by the high frequency current and an attraction force is formed that extends in the direction of the high frequency current conductor. As this attraction force is greater than the repulsion force due to the dielectric current, the jumping and floating described above normally will not occur.

It is an object of the present invention to overcome the difficulties associated with high speed continuous heating of non-magnetic metal caps as described above and to provide for a continuous high speed heating apparatus capable of imparting large amounts of heat to the bottoms of the metal cap.

It is a further object of the invention to provide a high frequency continuous heating apparatus which will heat the bottom parts of metal caps uniformally.

DISCLOSURE OF INVENTION

In accordance with the present invention, a continuous heating apparatus includes at least one pair of high frequency electric conductors connected to a source of high frequency electric current. The conductors of each pair are spaced from one another less than the diameter of the bottom of the caps which are to be heated. A guide panel is spaced from the conductors and between which the caps are moved by a transport means. The guide panels are adapted to engage the open ends of the metal caps when they are moved from the conductors towards the panel due to the repulsion effect caused by the high frequency electric current in the conductors reacting with the induced current in the caps. Preferably the conductors are arranged such that the current flows in mutually opposite directions which serves to increase the temperature rise of the caps due to Joule heat effect.

In order to insure even heating throughout the bottom of the cap, means are provided for rotating the cap while it is being moved by the transport means relative to the conductors.

In one form of the invention the guide panel comprises a smooth glass sheet spaced from the conductors and a turntable having notches on the outer periphery is included for engaging and moving metal caps relative to the conductors such that the edges of the open ends slide over the guide panel.

In a further form of the invention the guide panel comprises a smooth belt against which the open ends of the caps are urged by the repulsion effect of the high frequency electric current. The belt is moved by a transport means to move the caps with respect to the conductors.

In a still further form of the invention, the guide panel may comprise several parts with some of the parts being spring-biased towards the open ends of the caps being heated.

BEST MODES FOR CARRYING OUT THE INVENTION

Figure 1:
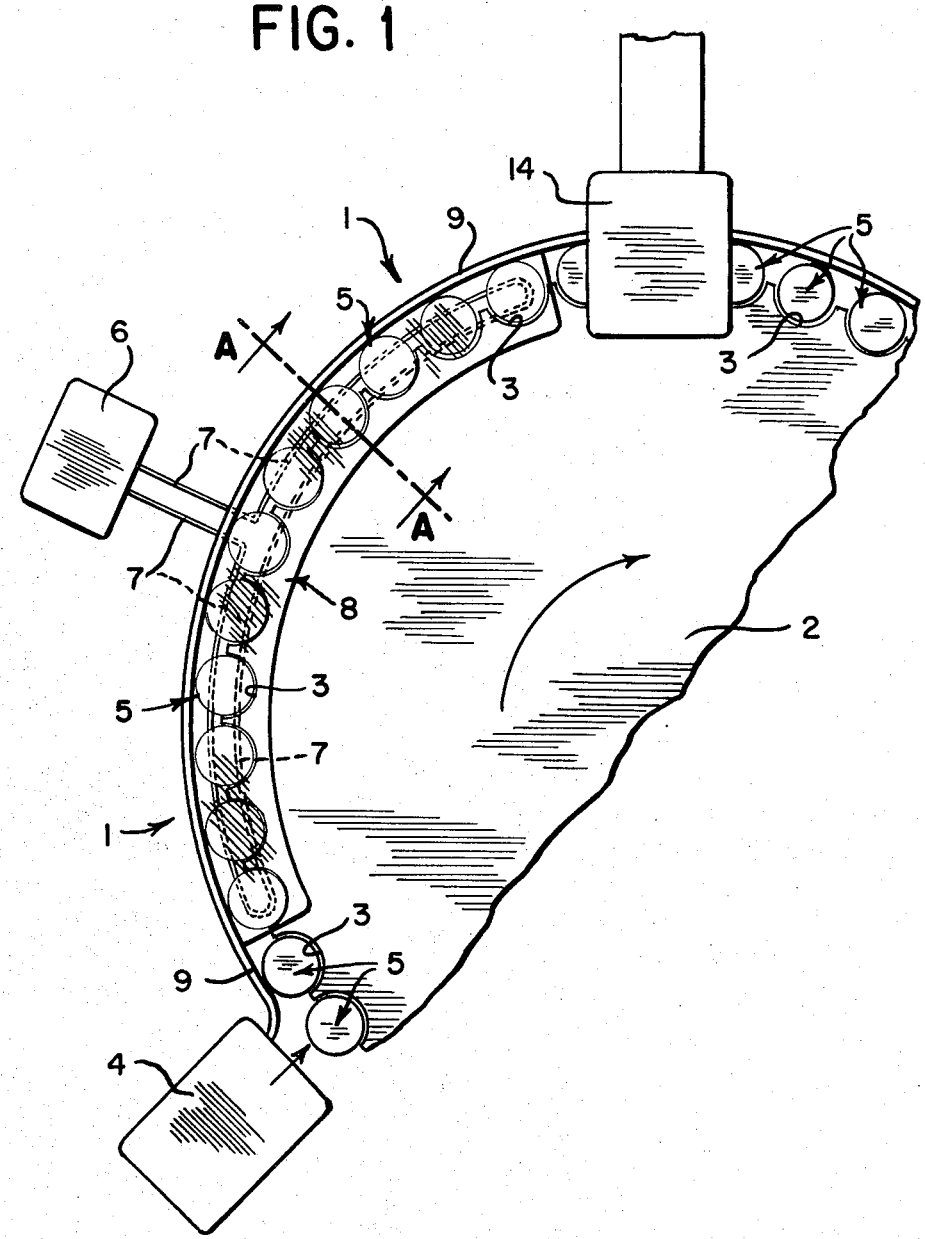
FIG. 1 is a partial diagrammatic plan view of a continuous heating apparatus constructed according to the invention.

Referring to FIG. 1 there is illustrated a continuous heating apparatus constructed according to the invention having a continuous heating station 1 for the continuous heating of caps, including non-magnetic caps. As shown, the apparatus comprises a transport means in the form of a rotating table 2 having a plurality of semi-circular notches 3 on the outer periphery thereof for engaging a plurality of caps 5 which are supplied to the notches by means of chute 4, such that the bottoms of the caps are positioned downwardly with the open ends of the caps being positioned above the bottoms. The caps are moved by the table 2 in the direction of the arrow shown in the drawings from the chute to a heating station 1. Guides, not shown, upon which the caps slide are positioned prior to the entry of the caps into the heating station and at the exit of the station.

Figure 2:
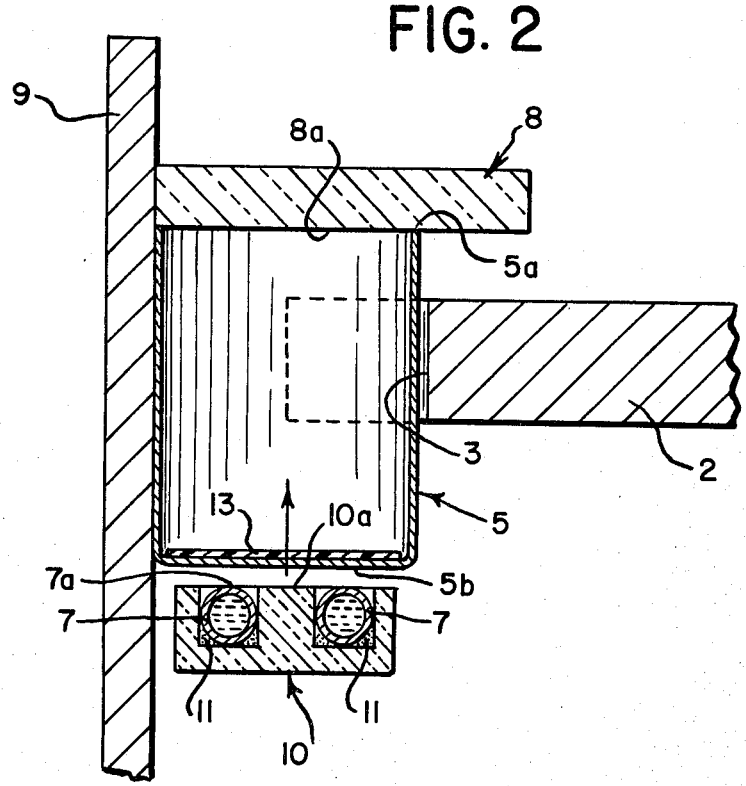
FIG. 2 is an enlarged sectional view taken along line A—A of FIG. 1.

The heating station 1 comprises high frequency conductors 7 which are connected to a source of high frequency current 6 and as shown in FIG. 2 includes a guide panel 8 and a vertical guide 9. As shown in FIG. 1, the guide panel 8 and the conductors 7 form therebetween a part of an unobstructed space through which the caps 5 are moved by the transport means.

Figure 3:
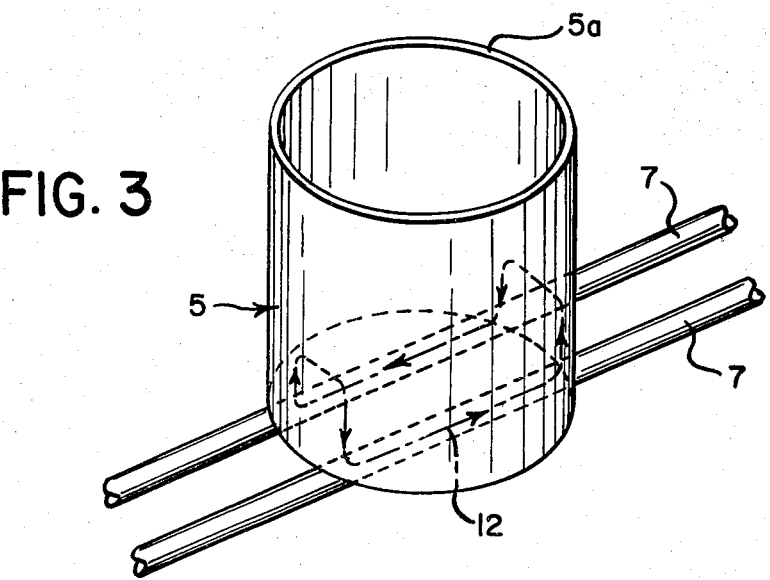
FIG. 3 is a perspective view illustrating current induced into the bottom of a metal cap by high frequency conductors.

Preferably as shown in FIG. 3, the direction of the high frequency current in the conductors 7 is in mutually opposite directions. The effect of this is to induce a flow of current in the bottom of a cap 5 as shown in FIG. 3 which form a close circuit 12. The current in the circuit will flow in relatively large amounts with the result that the temperature will rise in the bottom portion of a cap due to the Joule effect. If the current directions in the conductors 7 are both in the same direction, the closed circuit shown in FIG. 3 will not be completed so that there will be little or no temperature rise in the bottom of a cap because of the low effect of any induced current. For the same reason, there would be no temperature rise in a cap if only one conductor were utilized.

While the drawings show only one pair of conductors 7, further pairs of conductors may be utilized if the diameter of the caps is large and the rate of temperature rise desired is large or if a uniformity of temperature distribution over the bottom of the caps is desired.

It is important that the spacing between the conductors, that is the spacing between the central coil wires in the conductors, be smaller than the diameter of the bottom of the caps, or be less than the shortest length of a cap when a cap is non-circular. Further the spacing between the conductors should be approximately equal or slightly larger than the radius of the bottom of the caps and the center of the bottom of the caps should pass substantially through the centerline between the conductors to help insure a high heating of the bottom of the caps as well as a uniform temperature distribution of heat in the bottom of the caps. Further it is important that both conductors be connected to a high frequency source of electricity since if only one of the conductors is reactive, heat efficiency lowers substantially and heating of the caps becomes impossible.

The diameter of each conductor 7 increases generally with the diameter of a cap to be heated. For example with cap diameters of 15–25 mm., 26–40 mm. and 41–60 mm. the conductor diameters should be respectively approximately 4 mm., 6 mm., and 8 mm. This is because the larger the cap diameter, the greater the need for larger currents to flow through the conductors, and because with smaller diameter conductors, the Joule heat effect loss of the conductors is greater. This has to be balanced however with the fact that the larger the conductor diameter, the smaller will be the electromagnetic coupling between the conductor and the cap resulting in a decrease of heating efficiency.

Any differences in the distance between a conductor and the bottom part of the cap will affect the sensitivity of the mutual induction effect and the amount of induction current in the bottom part of the cap. Therefore in order to prevent temperature variations and short circuits between the cap bottoms and the conductor, the conductors preferably are supported by an attachment 10 made of a synthetic resin such as Bakelite when using a vacuum-type tube generator or made of an insulating high permeability material such as ferrite when a transistor-type generator is used. The conductors are retained in the attachment 10 by means of an epoxy resin adhesive 11 with the result that the conductors are rigidly positioned during heat treatment of the caps.

The high frequency power source 6 may be of any desired type. However, in the case of a high frequency on the order of 100 kHZ to 10 Mhz, a vacuum-type power source should be used, while in the case of lower frequencies on the order of 10 kHz to 80 kHz, a transistor-type power source should be used.

Where a transistor-type power source is used, the attachment 10 is made of a high permeability insulating material such that the electro-magnetic coupling between the conductors 7 and the bottom of the caps increases to increase heating efficiency while at the same time increasing the uniformity of heating of the cap bottoms. Where vacuum tube power sources or generators are used, the impedence in the parts of the conductors corresponding to the crevices in the shells of the caps becomes high if a high permeability insulating material is used. This results in flow of current being blocked such that there is little effectiveness in heating of the caps even though a high permeability insulating material is used in the attachment 10. A further advantage of using a transistor-type generator is that such a generator has a low operating voltage so that the voltage can be supplied to the high frequency conductors without any need of regulating output impedance by any output transformer thus increasing efficiency and allowing the total apparatus to be minaturized.

As described earlier with reference to prior art apparatus, when a cap of a non-magnetic material is moved over the high frequency current conductor 7, the cap tends to jump and float upwardly due to repulsion forces arising from reaction between the induced current in the cap and the current flowing in the conductors. Guide panel 8 limits this upward movement of the cap from the conductors and thus maintains the cap close enough to the conductors so that the heating of the cap will occur. As shown in FIG. 2, the lower surface 8a of the guide 8 provides a sliding surface against which the open top 5a of the cap 5 may slide when driven by the transport means 2 while at the same time maintaining the distance between the cap bottom surface 5b and the conductors 7 to allow efficient heating at the bottom of the cap and to maintain the temperature as uniform as possible.

It is important that the surface 8a be smooth so as to prevent any damage from friction during sliding of the cap with respect to the surface. Panels in the form of ceramic plates or strengthened glass plates on the order of 5-10 mm. thickness provide such a surface with glass plates in addition providing easy observation of the caps as they pass through the apparatus.

The conductors 7 are water-cooled. The distance between the edge 7a of the conductor and the bottom surface 5b of the caps should be on the order of 1 mm. maximum and preferably 0.5 mm. maximum in order that the mutual induction relation of the cap bottom and the conductor reaches a desired temperature as indicated by line A of FIG. 4 and when the attachment 10 is made of a low permeability insulating material. The distance, however, should not be less than 0.1 mm. because of the likelihood of a short circuit. When using a high permeability insulating material in the attachment 10, as shown by curve b in FIG. 4, the distance between surface 10a of the attachment and cap bottom surface 5b must be on the order of 2 mm. maximum and preferably 1 mm. maximum. Since ferrite which is generally used as a high permeability insulating material is brittle, it is necessary to protect the attachment surface 10a with an insulating sheet, such as Bakelite, about 0.4 mm. thick with the result that the spacing between the attachment surface and the cap bottom will be at least about 0.4 mm.

The height of the caps in each lot of caps which are heated is such that the spacing between the guide panel 8 and the conductors is set. The spacing between the conductors and the cap bottom surfaces can be varied to accommodate caps of different heights by adjusting the spacing of the guide panel 8 with respect to the conductors 7 where a new lot of caps having different heights are to be heated. The spacing of the guide panel 8 may be varied by utilizing a compressed air ram to move the panel 8 with respect to the conductors.

Further in order to help insure the even temperature distribution on the bottoms of the caps, it is important that both conductors be evenly spaced from the lower surface of the guide panel 8.

An indication current circuit 12 which is induced in the caps as shown in FIG. 3 will heat the bottom of the cap due to the Joule effect, and over a period of approximately one second, the temperature in different portions of the bottom part of the cap may vary over a range of 20°-30° C. In order to reduce this temperature difference in the bottom parts of the cap, the cap may be rotated during heating. This is accomplished by applying a lining of a low friction material, such as Teflon, to the part of the notch 3 which contacts the cap while applying a lining of a material having a comparatively high friction co-efficient, such as a silicone rubber, to the inner surface of the vertical guide 9 which contacts the cap. Rotation of the table 2 then results in rotation of the cap since it presses against the inner surface of the vertical guide 9 which is fixed.

Rotation of the cap as explained above will result in the temperature rise in the bottom central area of the cap immediately above the two conductors and this temperature will be substantially higher than the temperature at the peripheral areas of the cap making for greater non-uniformity of temperature. This non-uniform temperature distribution is desirable with prize caps in which easy peeling of a liner layer is required. The apparatus of the invention allows non-uniform heating of a cap bottom to achieve this feature as described above.

To further explain the invention, reference is made to a specific example utilizing the apparatus of the invention in connection with heating the bottom surface of an aluminum cap to which a polyethylene liner is to be affixed.

Initially an adhesive primer 13, for example polyethylene oxide or anhydride maleic acid modified polyethylene disbursed in epoxy phenol paint, was painted onto an inner bottom surface of annealed aluminum caps 5 which were 0.22 mm. thick, had a diameter of 28 mm. and a height of 15 mm. The caps were supplied from a chute to a notch 3 of a rotating table 2. The caps were delivered to the heating station 1 which was 80 cm. long and which was heated by high frequency induction on its bottom part.

In this case the frequency of the current supplied was 25 kHz supplied by a transistor generator, the output of which was 10 kW. The distance between the bottom surface of the caps and the attachment upper surface 10a was 0.7 mm. The number of caps charged in the heating station at one time was 20 with the passage through the heating station of a single cap taking one second. The caps were not rotated. The aluminum cap bottoms were heated to a minimum temperature of 140° C. and a maximum temperature of 160° C., the temperature being measured by a thermal paint after the caps emerged from the heating station. This particular temperature is sufficient to cause complete adhesion between the adhesive primer and the polyethylene liner at a press station positioned after the exit of the heating station. Aluminum caps heated in the above manner were then moved past a guide, not shown in the drawing, and entered a molten polyethylene particle supply station 14 where molten polyethylene particles were supplied substantially to the center of the bottom surface. The caps were then delivered to a press station, not shown, where the molten polyethylene particles were compressed with a cool punch to form a sheet which then hardened to form a liner sealed to the inside bottom surface of a cap. As the shell wall parts of caps were not heated, there was no delay in hardening of the polyethylene sheets due to any heat retained in the cap bodies.

While the apparatus as described above is shown with the high frequency current conductors being contained in a horizontal plane, it is obvious that the apparatus could be turned 90° with the conductors positioned in a vertical plane in which case the guide panel would also lie in a vertical plane.

Figure 5:
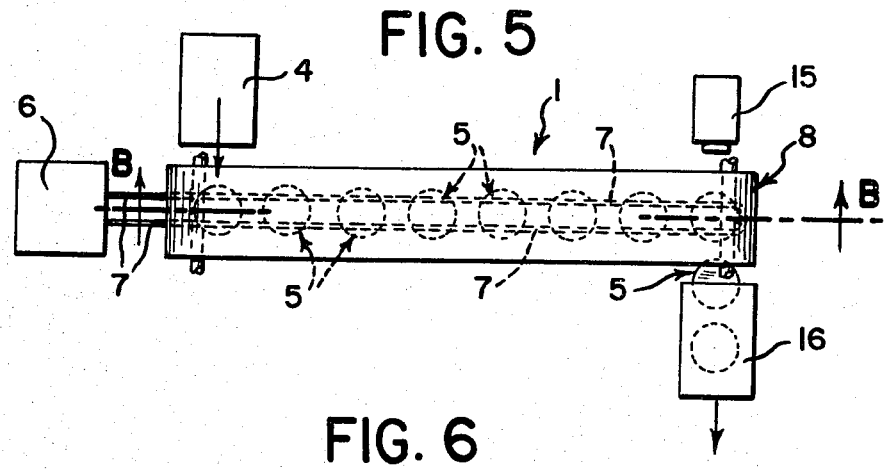
FIG. 5 is a further embodiment of the invention illustrating a continuous heating apparatus having the guide means in the form of a moveable endless belt.
Figure 6:
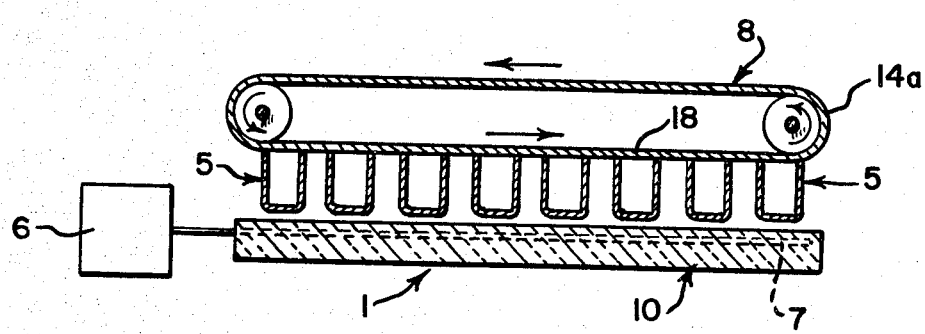
FIG. 6 is a side sectional view of the apparatus of FIG. 5.

A further embodiment of the invention utilizing a continuous heating station 1 is shown in FIGS. 5 and 6 where the guide panel takes the form of an endless belt 18 driven by a drive pulley 14a to move in the direction of the arrows.

In this form of the invention, metal caps 5 are charged from a chute 4 over high frequency current conductors connected to a high frequency power source 6. The caps are floated upward by repulsion forces and are received and supported by the lower surface of the guide panel or belt 18 and are moved over the conductors to an exit end of the heating apparatus where the caps are pushed off the belt by a plunger 15 to a further station 16. As shown the belt 18 and conductors 7 form therebetween an unobstructed space through which the caps are moved.

A rotary cylinder could be used in place of the belt 18 in the embodiments of FIGS. 5 and 6.

While the apparatus of the invention has been described for use with non-magnetic caps, such as aluminum caps, the apparatus nevertheless may be used with caps formed of strong magnetic material such as tin plate caps. The tin plate caps will also jump and float up from the conductors depending on such conditions as weight, size and shape of the caps, strength and frequency of the current in the conductors and the distance between the conductors and the bottom surface of the caps.

Figure 7:
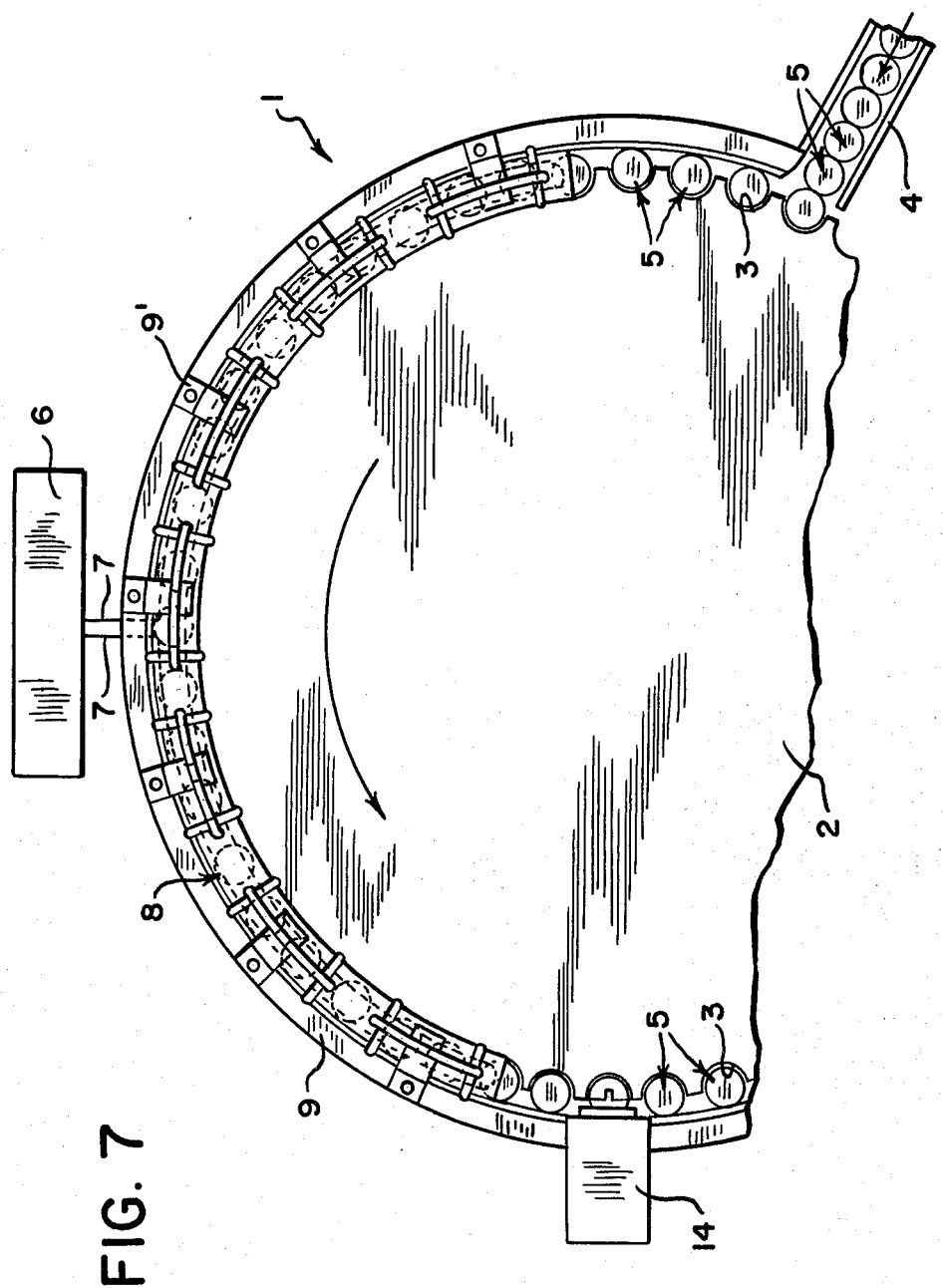
FIG. 7 is a plan view of a still further embodiment of the invention illustrating a continuous heating apparatus having guide means spring-biased towards the open ends of caps.
Figure 8:
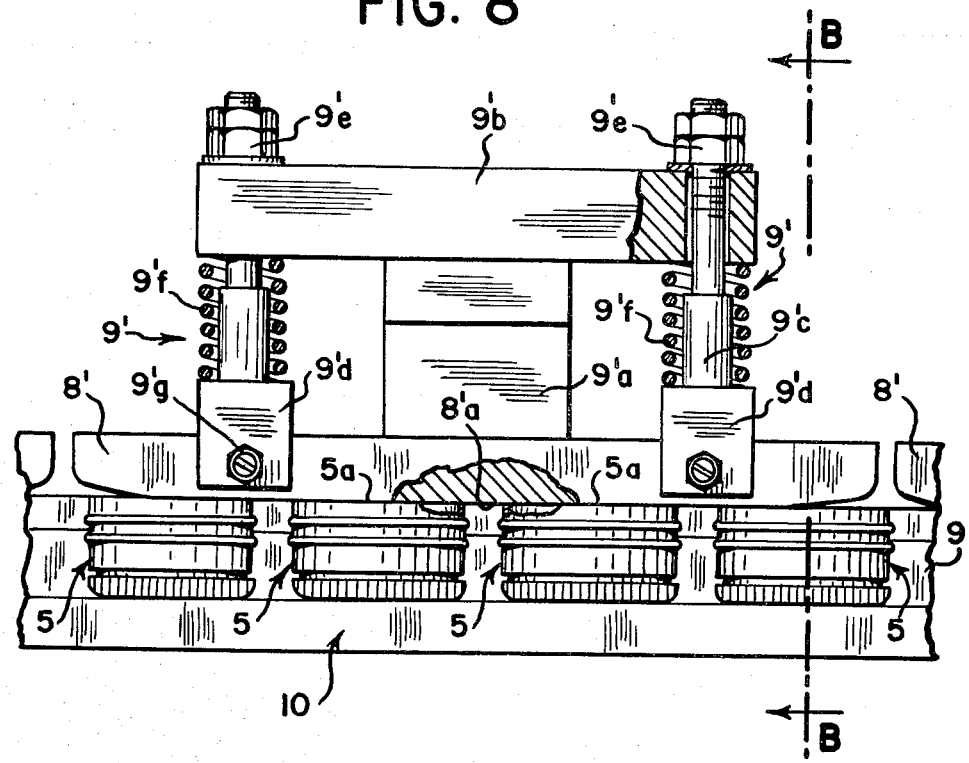
FIG. 8 is an enlarged front view of the apparatus of FIG. 7.
Figure 9:
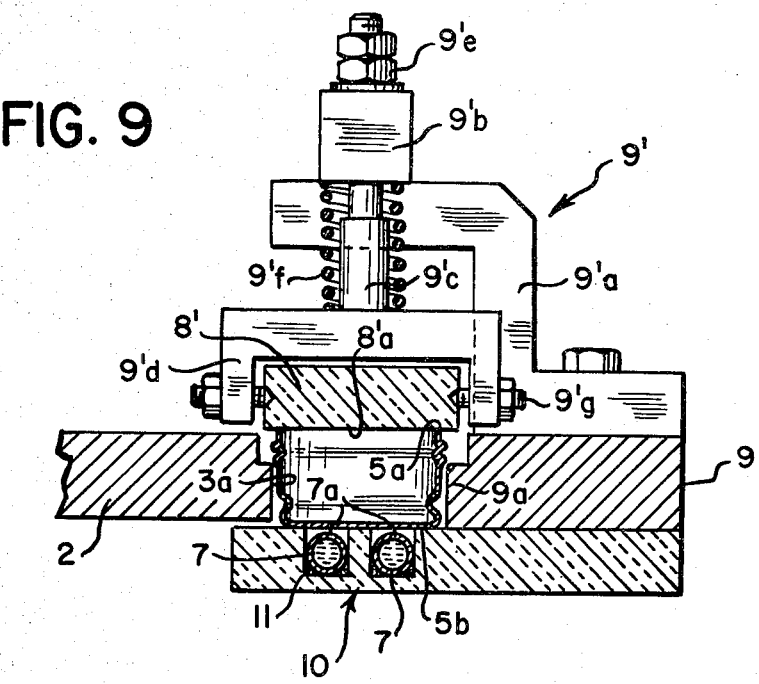
FIG. 9 is a cross-sectional view of FIG. 8 taken along lines B—B.

A further embodiment of the invention is illustrated in FIGS. 7-9 in which parts corresponding to like parts in FIGS. 1-3 have the same numerals. As shown, the continuous heating apparatus has a continuous heating station 1 and a rotatable table or transport means 2 including notches 3 for engaging and transporting caps 5 fed to the table 2 by a supply chute 4. A high frequency power source 6 is connected to conductors 7 which extend beneath the heating station to heat caps in the same manner as with the embodiment of FIG. 1. A plurality of guide plates or panels 8' extend around the periphery of the table 2 and serve, as in the case of the embodiment of FIG. 1, to limit upward movement of the caps away from the conductors because of the repulsion force between the induced current in the caps and the current in the conductors 7.

Each guide plate 8 comprises a strip of sheet material having a width which is larger than the outer diameter of the caps to be heated and each plate 8' is tapered at its ends to prevent the open ends of the caps from catching on the plate ends when the caps are moved beneath the plates by the transport means or table 2. The plates may be straight on their long sides or have a curvature in which case their centers of curvature will be the same as the center of the table 2. There is no particular limitation as to the length of the plates other than they should be of a length that a plurality of caps having different heights may pass through the apparatus simultaneously from a standpoint of easy adjustment for cap height during operation of the apparatus. By this arrangement, when caps of a lot having different heights pass through the apparatus, it will be possible to minimize occurrences where the bottom of the caps are not heated sufficiently because of any excess distance between the bottom of the caps and the conductors. Where the heating station is on the order of 80 cm. in length, a plurality of plates should be used. If the spacing between plates is too great, there is a possibility that the caps may tilt and catch at the entrance of the next guide plate or, even fly out of the heating station because of the repulsion forces.

Each guide plate 8' is supported by a guide plate support means 9' including a Z-shaped bracket 9'a-which rests on a vertical guide 10'. A fixed horizontal rod 9'b is mounted at its center to the upper horizontal leg of Z-shaped bracket 9'a and has vertical bolts 9'c passing through vertical holes in both of its ends where the bolts are moveable in the holes. The lower ends of the bolts are attached to C-shaped support frames 9'd. The vertical movement of support frames 9'd is adjusted by turning double nuts 9'e to move the bolts against the face of compression springs 9'f operatively positioned between the support frames and the horizontal rod 9'b.

Each guide plate 8' is attached to the support frame by pointed fastening screws 9'g.

The elements comprising the guide plate support means 9' with the exception of the springs 9'f should be made of non-magnetic material such as brass.

Figure 4:
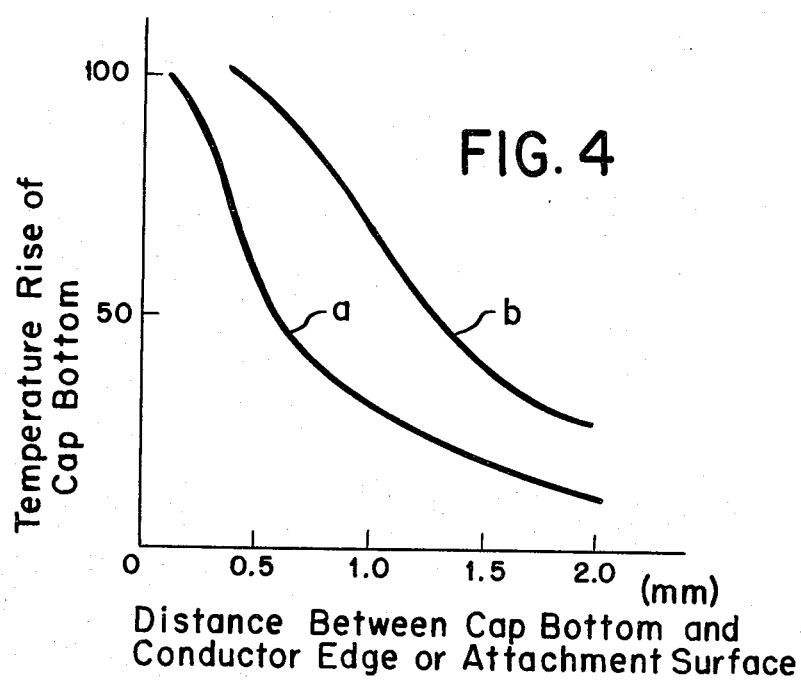
FIG. 4 is a graph illustrating rise of temperature of the bottom of a cap as a function of distance between the bottom of a cap and the edge of the high frequency conductors (curve a) and the edge of a support attachment containing the conductors (curve b)

Metal caps ordinarily undergo edge trimming after stamping to give their shell walls a fixed height after which they are subjected to bead processing and knurling operations. In practice, even if the caps are all of the same type and have the same height after trimming, they may have after bead processing and knurling height differences on the order of ±0.2 mm. depending on the lot. Consequently if the height of the guide plate is fixed, a maximum difference of about 0.4 mm. may occur in lots in the distance between the cap bottom surfaces 5b and the edges 7a of the conductors. As shown by FIG. 4, this difference can result in variations of temperature rise of a substantial number of degrees. By using the guide plate construction of FIGS. 7-9, the differences in cap heights can be cancelled out such that it becomes possible to maintain a prescribed temperature in each lot of caps.

In practice, the distance between the lower surface 8'a of each plate 8' and the upper surface of the fixed elements is set by the adjustment nuts 9'e so that it is equal to the minimum height of the caps of a lot. During passage of the caps through the apparatus, the caps will move due to the repulsion force against the plates 8'. When the sum of the weight of the guide plate and its support and the compressive force of the springs exceeds the repulsion force, the caps are prevented from floating upwardly regardless of the heights of their shells, and the lower surface of the caps will slide along the fixed element 11' containing and supporting the conductors such that the temperature rise on the cap bottoms is kept fixed. When caps of a lot having a larger height than the minimum pass through, the guide plate 8' and nuts 9'c will rise only to the difference between the minimum and actual height maintaining the bottom surface of the caps on the fixed elements. FIG. 8 illustrates this condition.

In the event the floating or repulsion force exceeds the sum of the weight of the guide plate, its support, and the force of the compression spring, floating of the caps will occur. The floating force is, however, not related to the height of the cap wall, and when the compression spring is long, the compressive force of the spring will not vary even when the guide plate moves vertically on the order of 0.2 mm. The greater repulsion force causing floating may result from a change in current in the conductors which increases the induced current in the cap to maintain the temperature at the same level, as if the cap were not floated. In this instance, the open end of a cap would slide along the lower surface of a guide plate and the bottom of the cap would not contact the fixed element.

A continuing heating apparatus according to the invention makes it possible to supply large amounts of heat to the bottoms of metal caps, particularly non-magnetic metal caps, utilizing compact apparatus which may operate at speeds in excess of 100 caps per minute. The apparatus also provides convenient regulation of the temperature distribution at the bottom of the cap within a certain range and further results in an apparatus which heats only the bottom of the cap and does not waste heat on parts not requiring heating, such as the shell wall part of the cap.

We claim:

1. In a continuous heating apparatus for continuously heating non-magnetic metal caps so as to thermally adhere thermoplastic liners to the inner surface of the bottom of the caps, the improvement comprising in that said apparatus has a cap feed means for supplying caps with their bottoms positioned downwardly and their open ends positioned upwardly, at least one pair of high frequency electric conductors positioned beneath and facing the bottom of the metal caps to be heated and being spaced from each other by an interval less than the diameter of the bottom of a cap, a source of high frequency electric current connected to said conductors to cause a current flow in opposite directions in each said pair of conductors, a guide panel formed with a ceramic plate spaced from said conductors a distance slightly greater than the height of a cap to form therebetween part of an unobstructed space through which metal caps may move and where said guide panel is adapted to engage the open ends of said metal caps which are moved from the conductors towards said panel under the influence of the high frequency electric current, and a rotatable table having a plurality of semicircular peripheral notches to engage the side wall of a metal cap to move the metal cap through the space relative to said conductors with the open end of the metal caps slipping along said guide panel.

2. In a continuous heating apparatus for metal caps according to claim 1 having in addition means for rotating said caps while they are in engagement with said guide panel.

3. In a continuous heating apparatus for metal caps according to claim 2 wherein said means for rotating said caps comprises a guide having a friction surface adapted to engage a side of a cap whereby said cap will be rotated as it is moved by said table.

4. In a continuous heating apparatus for metal caps according to claim 1 wherein said guide panel is moveable and having in addition spring means urging said guide panel in a direction towards said conductors against forces tending to move said metal caps towards said guide panel.

5. In a continuous heating apparatus for metal caps according to claim 4 wherein said spring means is adjustable to vary the spacing of the guide panel with respect to the conductors prior to being engaged by a metal cap.

* * * * *

UNITED STATES PATENT AND TRADEMARK OFFICE
CERTIFICATE OF CORRECTION

PATENT NO. : 4,340,801

DATED : July 20, 1982

INVENTOR(S) : Kazuhisa Ishibashi et al.

It is certified that error appears in the above—identified patent and that said Letters Patent are hereby corrected as shown below:

On the Title page:

Item [75], "Omi" should be --Ohmi--

Col. 6, line 12, "indication" should be --induction--

Signed and Sealed this

Fifth Day of October 1982

[SEAL]

Attest:

GERALD J. MOSSINGHOFF

Attesting Officer  Commissioner of Patents and Trademarks